Oct. 9, 1962 H. B. FROST 3,058,057
IONIZATION MANOMETER CIRCUIT
Filed Dec. 16, 1960 2 Sheets-Sheet 1

INVENTOR
H. B. FROST
BY David P. Kelley
ATTORNEY

Oct. 9, 1962 H. B. FROST 3,058,057
IONIZATION MANOMETER CIRCUIT
Filed Dec. 16, 1960
2 Sheets-Sheet 2
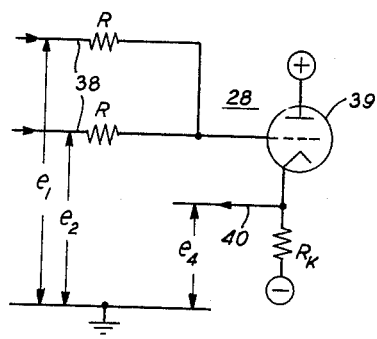
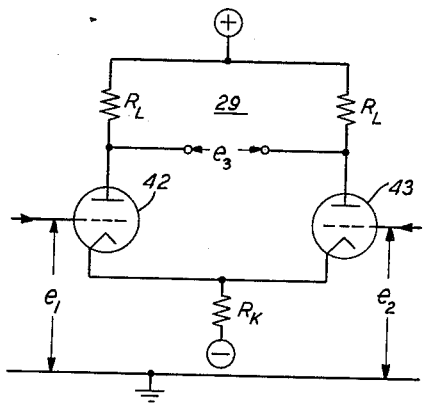
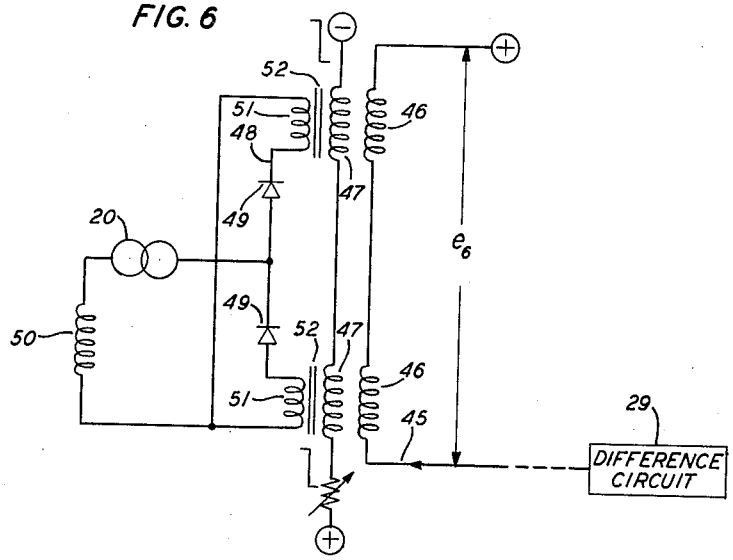
INVENTOR
H. B. FROST
BY
ATTORNEY

United States Patent Office 3,058,057
Patented Oct. 9, 1962

3,058,057
IONIZATION MANOMETER CIRCUIT
Harold B. Frost, Millington, N.J., assignor to Bell Telephone Laboratories, Incorporated, New York, N.Y., a corporation of New York
Filed Dec. 16, 1960, Ser. No. 76,187
7 Claims. (Cl. 324—33)

This invention relates to apparatus for measuring low gas pressures and, more particularly, to electrical circuits for use in conjunction with ionization manometers.

An ionization manometer is a device that measures low gas pressure through the ionization of certain molecules of the gas. An envelope encloses a sample of the gas to be measured, and a predetermined electrical ionizing current is emitted from a cathode to an electron collector within the envelope. Some of the emitted electrons collide with gas molecules to form positively charged gas ions which are then collected by a negatively biased ion collector. The number of gas ions impinging on the ion collector is directly proportional to the gas pressure within the envelope and can be computed by measuring the electrical ion current in the ion collector. A sensitive ammeter connected to the ion collector can therefore be scaled to give a direct reading of the gas pressure within the envelope.

One problem in gaining accurate pressure indications stems from the fact that the ionizing (emission) current must be of a single predetermined value if the ion current is to vary directly with pressure. Hence, the accuracy of the device is critically dependent on the accurate operation of the elements controlling the ionizing current. If, for example, the ionizing current is higher than intended, a larger number of gas molecules will be ionized and the ammeter will indicate a higher gas pressure than actually exists. Other problems inhere when the device is used to measure a wide range of pressures.

The ionization manometer is used frequently for measuring the gas pressure in vacuum-tube-evacuation apparatus. Very often, the gas pressures in such apparatus vary quickly over several decades, such as from $10^{-8}$ to $10^{-2}$ millimeters of mercury. The wide fluctuations of ion current, which thereby result, cannot be indicated on a single-range ammeter, and various complicated switching systems must be incorporated into the ion collector circuit to give fairly accurate pressure readings over a wide range.

Still another problem is the non-linearity of the ion current with respect to gas pressure over a wide range of pressures at a given magnitude of ionizing current. When a high ionizing current is used to produce an ion current that is proportional to gas pressure at extremely low pressures, the ion current will not be directly proportional to gas pressure at relatively high pressures. For example, if the ionizing current is adjusted to give a linear response of ion current with respect to pressure in the region of $10^{-8}$ to $10^{-6}$ millimeters of mercury, incorrect indications will be shown on the ammeter if the pressure suddenly jumps to $10^{-2}$ millimeters. On the other hand, if the ionizing current is adjusted to give linear response at relatively high pressures, the ion current produced at low pressures may be so small as to be very difficult, if not impossible, to detect and record.

Accordingly, it is an object of this invention to provide accurate measurement of low gas pressures over a wide range of gas pressure.

It is another object of this invention to eliminate switching apparatus in a device for measuring low gas pressures over a wide range of gas pressure.

It is still another object of this invention to eliminate the effects of inaccurate operation of the elements controlling the ionizing current in an ionization manometer circuit.

These and other objects of my invention are attained in an illustrative embodiment thereof which includes an ionization manometer comprising a cathode, an electron collector and an ion collector, all surrounded by an envelope containing a small quantity of gas, the pressure of which is to be measured. The ionizing current flowing between the cathode and the electron collector establishes an ion current in the ion collector. The magnitude of the ion current is proportional to the magnitude of the gas pressure within the envelope and the ionizing current.

According to one aspect of my invention, the ionizing current is not of a single predetermined value as in prior devices, but rather, it varies as the gas pressure varies. Because of this variation of the ionizing current, the range of variation of the ion current is reduced. The ion current is thereby constantly maintained in substantially linear proportion to the gas pressure and the ionizing current. According to another aspect of my invention, the ion current is compared with the ionizing current before an indication of gas pressure is made.

It is a feature of this invention that the ionizing current be controlled by a voltage which is a function of the product of the ion current and the ionizing current. The control voltage controls a variable impedance in the ionizing current supply circuit such that the ionizing current is reduced as the control voltage increases. The control circuit thereby acts as a servomechanism or feedback circuit to maintain the ion current within predetermined limits regardless of sharp gas pressure fluctuations.

It is another feature of this invention that the current which actuates the pressure indicating ammeter be a function of the ratio of the ion current to the ionizing current. The ion current produced within the manometer is directly proportional to the gas pressure and to the ionizing current. The ratio of the ion current to the ionizing current is therefore directly proportional to gas pressure. Besides continually compensating for fluctuations in the ionizing current resulting from the aforementioned feedback circuit, this feature compensates for any variation in the operation of other elements in the ionizing supply circuit which may affect the ioning current.

It is still another feature of this invention that the ion and ionizing currents be transmitted through logarithmic converters before being transmitted to the pressure indicator or fed back to the ionizing-current-supply circuit. The logarithm of the ratio of the ion and ionizing currents is attained by merely transmitting the logarithmically converted currents through a difference circuit ($\log A - \log B = \log A/B$). The output of the difference circuit is connected to the pressure indicator, which indicates the log of the pressure. Because the logarithms of the ion and ionizing currents do not vary as much with changes of pressure as do the unconverted currents, a single scale ammeter can be used to indicate large changes in gas pressure. Further, the effective ranges of the logarithmic converters is multiplied by two because they are used to convert both ion and ionization currents, the ratio of which determines pressure indication. If the actual pressure varies over eight decades, one logarithm converter can convert ion current over four decades, and the other can convert ionizing current over four decades, and the net pressure-indicating current is effectively converted over eight decades.

These and other objects and features of this invention will be more clearly understood from a consideration of the following detailed description, taken in conjunction with the accompanying drawing in which:

FIG. 4 is a schematic drawing of a sum circuit which can be used in the device of FIG. 1;

FIG. 5 is a schematic drawing of a difference circuit which can be used in the device of FIG. 1; and FIG. 6 is a schematic drawing of a voltage responsive variable impedance circuit which can be used in the device of FIG. 1.

Figure 1:
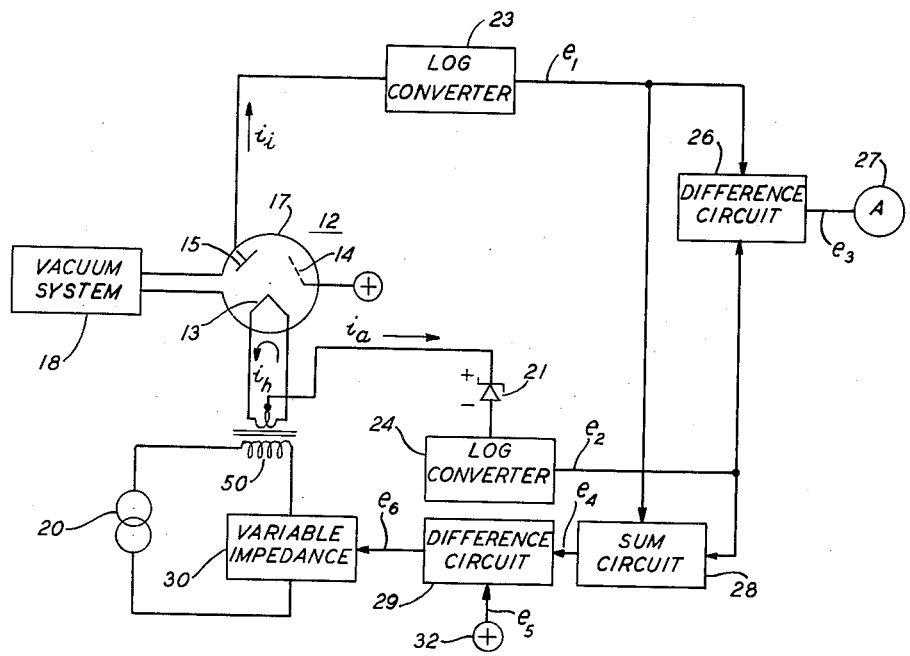
FIG. 1 is a single-line schematic drawing of an illustrative embodiment of this invention.

Referring now to FIG. 1, there is shown an ionization manometer 12 comprising a cathode 13, an electron collector 14 and an ion collector 15. The manometer is enclosed by an envelope 17 which is also connected to a vacuum system 18. The purpose of manometer 12 is to generate an electrical current indicative of the gas pressure within vacuum system 18. By virtue of the connection of the manometer to the vacuum system, the gas pressure within envelope 17 is substantially the same as that within the vacuum system.

Cathode 13 is heated by a heating current $i_h$ generated by a source 20. Electrons leave the cathode 13 as a function of the temperature of the cathode and are collected by the positively biased electron collector 14. During their migration to collector 14, some of the electrons collide with gas molecules within the envelope, forcing certain electrons in the gas molecules out of their molecular structure, thereby making the gas molecules positively charged ions. The cathode emission current is therefore referred to as ionizing current. A portion of the ions produced by the ionizing current are collected by the ion collector 15 and produce an ion current in the ion collector. The number of gas ions collected, and hence the ion current, is directly proportional to the gas pressure within the envelope and the magnitude of the ionizing current.

The cathode is biased at a positive potential with respect to the ion collector, by a biasing element 21, which is shown on the drawing as a Zener diode. This particular type of biasing element is advantageous in this case because its voltage drop does not change appreciably with changes of current. The more negative potential on the ion collector prevents electrons from being collected by the ion collector. The various specific structures of manometer 12, as well as the various biasing means, may take any of a number of well known forms.

As seen in FIG. 1, the ion current $i_i$ flows through a first logarithmic converter 23 and the ionizing current $i_a$ flows through a second logarithmic converter 24. As will be explained hereinafter, converters 23 and 24 establish, respectively, voltages $e_1$, $e_2$, that are proportional to the logarithms of the ion and ionization currents:

$$e_1 \propto \log i_i \qquad (1)$$

$$e_2 \propto \log i_a \qquad (2)$$

Voltages $e_1$ and $e_2$ are indicated on the drawing; the base of the logarithm depends upon the type of logarithmic converter used. The ion and ionizing currents then flow to an indicating circuit comprising a difference circuit 26 and an ammeter 27 and to a feedback circuit comprising a sum circuit 28, a difference circuit 29 and a variable impedance 30.

Difference circuit 26 gives an output voltage $e_3$ which is equal to the difference of the input voltages $e_1$ and $e_2$:

$$e_3 = e_1 - e_2 \qquad (3)$$

Since the difference of the logarithms (to the same base) of any two values is equal to the logarithm of the ratio of the two values, from Equations 1, 2 and 3:

$$\log e_3 \propto \log \frac{i_i}{i_a} \qquad (4)$$

The current flowing through ammeter 27 is proportional to $e_3$; ammeter 27 is scaled to give indications in terms of pressure. Inasmuch as the gas pressure within manometer 12 is directly proportional to the ion current and inversely proportional to the ionizing current, from Equation 4:

$$\log P = K \log \frac{i_i}{i_a} = K \log e_3 \qquad (5)$$

where P is the gas pressure within envelope 17 and K is a constant determined by the specific construction of manometer 12.

It may be advantageous that logarithmic converters 23 and 24 be of a different type, in which case another constant should be inserted in Equation 5 to compensate for any differences in the conversion constants of the two converters. In this case, an attenuator must be inserted between one of the log converters and difference circuits 26 to compensate for differences of the two logarithmic converters.

Assuming that the various elements of the indicator circuit including the manometer and the logarithm converters function properly, ammeter 27 will give a correct indication of the logarithm of the pressure. If, for example, cathode 13 emits a smaller quantity of current than was intended, the accuracy of the device will not be impaired because the pressure is automatically indicated as a function of the ionizing current. Further, wide fluctuations in gas pressure are not manifested by wide fluctuations in current flowing through ammeter 27 because the logarithm of the pressure does not fluctuate as much as the actual pressure.

Various other elements could be used in the indicator circuit in place of those shown; for example, a voltmeter, galvanometer or any of the various types of recorders could be used in place of ammeter 27.

Certain logarithmic converters establish a negative voltage in response to the positive current. As will be explained hereinafter, it may be advantageous to use this type of converter for converter 23. In this case, a sum circuit would be used in place of difference circuit 26 in order to compensate for the difference in signs of $e_1$ and $e_2$; the various sum and difference circuits are shown in FIG. 1 merely to indicate their logical functions.

With reference to the feedback circuit, sum circuit 28 establishes a voltage $e_4$ which is proportional to the sum of voltages $e_1$ and $e_2$:

$$e_4 \propto e_1 + e_2 \qquad (6)$$

Voltage $e_4$ and voltage $e_5$ from a potential source 32 are fed into difference circuit 29. Difference circuit 29 establishes a voltage $e_6$ which is proportional to the difference of voltages $e_4$ and $e_5$:

$$e_6 \propto e_4 - e_5 \qquad (7)$$

Voltage $e_6$ controls variable impedance 30 such that the impedance of the cathode heating circuit, comprising cathode 13 and source 20, varies in proportion to $e_6$. Hence, the heater current $i_h$ which heats the cathode varies inversely with voltage $e_6$:

$$i_h \propto \frac{1}{e_6} \propto \frac{1}{e_4 - e_5} \qquad (8)$$

Since the sum of the logarithms of any two values is equal to the logarithm of the product of the two values, Equation 6 can be re-written as:

$$i_h \propto \frac{1}{\log i_i i_a - e_5} \qquad (9)$$

The ionizing current $i_a$ emitted by cathode 13 is a function of the cathode heating current $i_h$. Hence we see from Equation 9 that as the product $i_i \cdot i_a$ increases, the ionizing current $i_a$ will be automatically reduced. The feedback circuit just described is therefore a form of servomechanism that maintains the product $i_i \cdot i_a$ substantially constant. Further, by properly adjusting the voltage $e_5$, currents $i_i$ and currents $i_a$ can be made fluctuate over predetermined ranges. This is advantageous for two reasons: the ion current is prevented from fluctuating to such a large extent that it would not be in direct proportion to gas pressure; if the logarithmic response of converters 23 and 24 are limited to some predetermined range, the ion and ionizing currents can be kept within these ranges. Further, as explained above, since ammeter 27 indicates a ratio of $e_1$ to $e_2$, its effective range can be made to be approximately twice that of either one of the converters 23 and 24.

FIGS. 2 through 5 schematically show various logarithmic converters, sum circuits and difference circuits that can be used in one embodiment of my invention. These circuits are shown by conventional double-line diagrams rather than single-line block diagrams as in FIG. 1. The voltage sources shown on these drawings are intended to be reference potentials to illustrate how the voltages on the various lines of FIG. 1 can be developed. For purposes of simplicity, these sources have not been shown on FIG. 1, but are intended to be included within the various blocks of that figure. Although these circuits have been found to be particularly effective when my device is used in conjunction with electron-tube-evacuation apparatus, they are not intended to limit the scope of the invention in any way.

Figure 2:
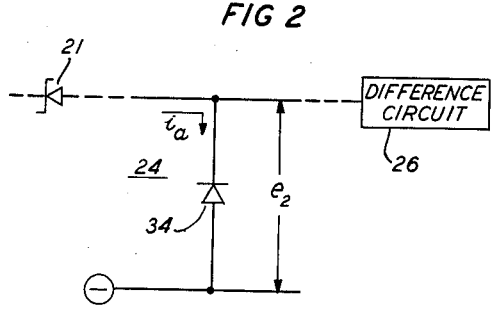
FIG. 2 is a schematic drawing of a logarithmic converter which can be used in the device of FIG. 1.

FIG. 2 illustrates a circuit that can be used for the logarithmic converter 24 in FIG. 1. Converter 24 comprises a logarithmic element 34 which is a diffused silicon diode, a device that is well known in the art. When the ionizing current $i_a$ flows through diode 34, a voltage $e_2$ is defined:

$$e_2 = M + N \log i_a \qquad (10)$$

where M and N are temperature-dependent constants of diode 34 which are readily determinable by those skilled in the art.

Figure 3:
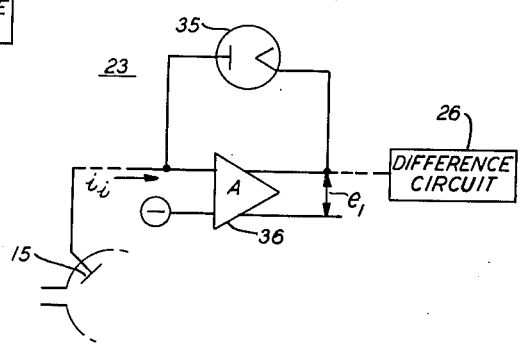
FIG. 3 is a schematic drawing of another logarithmic converter which can be used in the device of FIG. 1.

FIG. 3 illustrates a circuit which can be used for the logarithmic converter 23 of FIG. 1. Converter 23 comprises a thermionic diode 35 and an amplifier 36 connected in parallel. Assume that the thermionic diode is of a known type that developes a voltage $e_0$ in response to a current $i_0$ therethrough equal to:

$$e_0 = V + \beta \log i_0 \qquad (11)$$

The voltage $e_1$ produced in response to ion current $i_i$ will then be:

$$e_1 = \frac{-A}{A+1}(V + B \log i_i) \qquad (12)$$

where A is the amplification of amplifier 36 and V and B are temperature-dependent constants of diode 35 that are readily determinable. This type of logarithmic converter is more satisfactory for small currents than the converter of FIG. 2. In general, the ion current will be much smaller than the ionizing current, and so this type of converter may be preferable in many cases. Notice, however, that the voltage $e_2$ and the ion current $i_i$ have different signs. As explained above, a difference in signs of voltages $e_1$ and $e_2$ would require sum circuits where difference circuits are shown and vice versa.

FIG. 4 shows a circuit which can be used as the sum circuit 28 of FIG. 1. The two input voltages $e_1$ and $e_2$ are introduced on a pair of input lines 38. A resistor R, which may be of an arbitrary resistance, is included in each of the input lines. The resistors R should be large enough, however, to inhibit current flow between the two input lines. The input lines are connected to the grid of a triode 39. The plate and cathode of the triode 39 are connected respectively to positive and negative D.-C. sources. Because of cathode load $R_K$, an output voltage $e_4$ is produced on an output line 40, which is determined by:

$$e_4 = \frac{1}{2}\frac{\mu}{\mu+1}(e_1 + e_2) + \delta \qquad (13)$$

where $\mu$ is the amplification constant of triode 39 and $\delta$ is a voltage increment due to the contact potential between the grid and cathode of triode 39.

FIG. 5 is a difference circuit that can be used as the difference circuits 26 and 29 of FIG. 1. Two input voltages $e_1$ and $e_2$ are fed to the grids of like triodes 42 and 43 (input voltages $e_1$ and $e_2$ correspond to voltages $e_4$ and $e_5$ of difference circuit 29 of FIG. 1). The cathodes are biased by a large resistor $R_K$ and the plates are biased by two equal resistors $R_L$. A voltage $e_3$ is then developed between the plates of triodes 42 and 43 which is given by:

$$e_3 = K(e_1 - e_2) \qquad (14)$$

where K is the gain constant of the circuit.

FIG. 6 is a magnetic amplifier which may be used as the voltage-sensitive variable impedance 30 of FIG. 1. Voltage $e_6$ is fed into an input line 45 which produces a current flow through control windings 46. A bias current is then caused to flow through control windings 47. Two like diodes 49 are connected as shown to restrict current flow from generator 20. If cores 52 are not saturated over the A.-C. cycle of source 20, very little current flows in windings 51 and 50. If cores 52 are saturated over part of the A.-C. cycle of generator 20, substantial currents flow in windings 51 and 50. Proper arrangement of the bias current in windings 47 allows the degree of saturation of core 52 to be reduced as $e_6$ increases, so that the current flow in windings 51 and 50 is decreased as $e_6$ increases. Winding 50 which is connected to source 20 corresponds to winding 50 of FIG. 1. Through the arrangement shown, the current flowing through winding 50 varies inversely with the input voltage $e_6$.

It is to be reiterated that the various circuits shown on FIGS. 2 through 6 are merely illustrative of the circuits which could be used in the device of FIG. 1. These circuits have been illustrated because they have been found to be advantageous in a system for measuring gas pressures in electron tube evacuation apparatus wherein gas pressures vary from approximately $10^{-8}$ to $10^{-2}$ millimeters of mercury. Various other embodiments may be devised by those skilled in the art without departing from the spirit and scope of my invention.

What is claimed is:
1. In combination: an ionization manometer comprising a cathode and an electron collector for establishing an ionizing current therebetween, and an ion collector for transmitting an ion current; a first logarithmic converter connected to said ion collector; a second logarithmic converter connected to said cathode; means connected to said converters for indicating the difference of the logarithms of the ion current and the ionizing current; and a feedback circuit comprising: first means connected to said logarithm converters for establishing a voltage that is proportional to the sum of a logarithm of the ion current and a logarithm of the ionizing current; a source of reference potential; second means, connected to said first means and said source, for establishing a voltage that is proportional to the difference of said reference potential and said sum; and means for coupling said second means to said cathode.

2. In combination: an ionization manometer comprising a cathode, an electron collector and an ion collector; means for producing an ionizing current between said cathode and said electron collector; said ionizing current producing an ion current in said ion collector that is proportional to the gas pressure within said manometer and to said ionizing current; first means coupled to said ion collector and said cathode for establishing a first voltage that is a function of the ratio of said ion current and said ionizing current; second means coupled to said ion collector and said cathode for establishing a second voltage that is a function of the product of said ionizing current and said ion current; means for indicating the magnitude of said first voltage; and means controlled by said second voltage for controlling said ionization current.

3. The combination of claim 2 wherein said first voltage is directly proportional to the logarithm of the ratio of the ion current to the ionizing current and said second voltage is directly proportional to the logarithm of the product of the ion current and the ionizing current.

4. Apparatus for measuring low gas pressure comprising: an ionization manometer comprising a cathode, an electron collector and an ion collector; a cathode current supply circuit connected to said cathode comprising means for producing a cathode current, and a variable impedance; an indicator circuit comprising a difference circuit coupled at one end to said cathode and said ion collector, and an indicator connected to another end of said difference circuit; and a feedback circuit comprising a sum circuit coupled at one end to said cathode and said ion collector and connected at another end to said variable impedance, said variable impedance beng responsive to voltage changes in said feedback circuit for controlling said cathode current.

5. Apparatus for measuring low gas pressures comprising: a source of low pressure gas; means for discharging an ionizing current through said gas thereby ionizing certain gas molecules; means for collecting certain ionized gas molecules thereby establishing an ion current; first means coupled to said discharging means and said collecting means for establishing a first voltage whose magnitude increases as the ratio of the ion current to the ionizing current increases; means for indicating said first voltage, thereby indicating the gas pressure within said envelope; second means coupled to said discharging means and said collecting means for establishing a second voltage whose magnitude increases as the product of said ion and ionizing current increases; and means responsive to said second voltage for controlling said ionizing current.

6. The apparatus of claim 5 wherein the first voltage is directly proportional to a logarithm of the ratio of the ion current to the ionizing current and the second voltage is directly proportional to a logarithm of the product of the ion current and the ionizing current.

7. The apparatus of claim 6 wherein the means for controlling said ionizing current comprises means for varying said ionizing current in inverse proportion to variations of said second voltage.

References Cited in the file of this patent

The Review of Scientific Instruments, volume 27, No. 7, July 1956; pages 448 and 449.